(12) United States Patent
Swaminathan (10) Patent No.: US 11,893,902 B1
(45) Date of Patent: Feb. 6, 2024

(54) EDUCATIONAL TRAINING SYSTEM USING MECHANICAL MODELS

(71) Applicant: Prabhu Swaminathan, Millis, MA (US)

(72) Inventor: Prabhu Swaminathan, Millis, MA (US)

( * ) Notice: Subject to any disclaimer, the term of this patent is extended or adjusted under 35 U.S.C. 154(b) by 22 days.

(21) Appl. No.: 17/734,439

(22) Filed: May 2, 2022

Related U.S. Application Data (60) Provisional application No. 63/187,261, filed on May 11, 2021.

(51) Int. Cl.
*G09B 23/10* (2006.01)
*G09B 9/00* (2006.01)

(52) U.S. Cl.
CPC .............. *G09B 23/10* (2013.01); *G09B 9/00* (2013.01)

(58) Field of Classification Search
CPC ........ G09B 23/06; G09B 23/08; G09B 23/10; G09B 9/00
See application file for complete search history.

(56) References Cited

U.S. PATENT DOCUMENTS

| | | |
|---|---|---|
| 4,742,473 A | 5/1988 | Shugar et al. |
| 5,783,136 A | 7/1998 | Enke |
| 6,773,264 B2 | 8/2004 | Schoendorff et al. |
| 7,430,038 B2 | 9/2008 | Szaroletta et al. |
| 7,840,393 B1 | 11/2010 | Whirley et al. |
| 9,280,913 B2 | 3/2016 | Peters et al. |
| 9,978,177 B2 | 5/2018 | Mehr et al. |
| 10,482,790 B1 | 11/2019 | Pittman |
| 10,753,957 B2 | 8/2020 | Escott et al. |

(Continued)

FOREIGN PATENT DOCUMENTS

| | | |
|---|---|---|
| CN | 2254223 Y | 5/1997 |
| CN | 206312503 | 7/2017 |
| KR | 101440336 B1 | 9/2014 |

OTHER PUBLICATIONS de Weck, Olivier. Engineering Design and Rapid Prototyping [Online Course]. MIT OpenCourseWare. Jan. 2007 [retrieved on Jul. 10, 2023]. <https://ocw.mit.edu/courses/16-810-engineering-design-and-rapid-prototyping-january-iap-2007/pages/syllabus/>. (Year: 2007).*

(Continued)

*Primary Examiner* — Robert J Utama
*Assistant Examiner* — Correll T French
(74) *Attorney, Agent, or Firm* — John Rizvi; John Rizvi, P.A.—The Patent Professor (57) ABSTRACT

A teaching system includes a CAD/CAM facility that features a CAD-generated crane boom design and a CAM-generated crane boom model based on the crane boom design. A simulator runs a simulation of the crane design using a finite element analysis (FEA) to evaluate the stress-strain performance of the crane design as a function of variable input parameters. The crane boom model is tested under various load and operating conditions to measure its behavioral response in terms of stress-strain behavior. A sensor array monitors the stress-strain behavior of the crane model during testing. The testing performance of the CAM-generated crane model is will allow a comparison with the FEA-based simulation results of the CAD/CAM generated crane design.

17 Claims, 10 Drawing Sheets

(56) References Cited

U.S. PATENT DOCUMENTS

| | | | |
|---|---|---|---|
| 11,142,435 B2* | 10/2021 | Hofmeister | G06Q 50/08 |
| 2010/0044332 A1* | 2/2010 | Cameron | B66C 15/065 |
| | | | 212/278 |
| 2011/0111381 A1 | 5/2011 | Mitra et al. | |
| 2013/0323701 A1 | 12/2013 | Moulinjeune et al. | |
| 2014/0162236 A1 | 6/2014 | Capaldi | |
| 2016/0148522 A1 | 5/2016 | Rowland et al. | |
| 2018/0110603 A1 | 4/2018 | Stipek, Sr. et al. | |
| 2019/0019429 A1 | 1/2019 | Palberg et al. | |
| 2019/0271967 A1 | 9/2019 | Radjou et al. | |
| 2019/0325783 A1 | 10/2019 | Meess et al. | |
| 2020/0234609 A1 | 7/2020 | Murphy et al. | |
| 2022/0156427 A1* | 5/2022 | Senoo | G06F 30/20 |

OTHER PUBLICATIONS

Screen captures from de Weck Online Course titled "MITSET: Team M4: Mechanical Climber (Weight)," xyasfdi pages, uploaded in Jan. 2007. Retrieved from Internet on Jul. 10, 2023: <https://ocw.mit.edu/courses/16-810-engineering-design-and-rapid-prototyping-january-iap-2007/resources/team-m4/>. (Year: 2007).*

Mong, Michael; O'Neill, Kevin; Ho, Samatha, "Group 26 Group Project for course 24262: Stress Analysis in Carnegie Institute of Technology," "Crane Project," uploaded Spring 2018. Retrieved from Internet on Jul. 10, 2023: <http://saho.studio/crane.html>. (Year : 2018).*

* cited by examiner

EDUCATIONAL TRAINING SYSTEM USING MECHANICAL MODELS

FIELD OF THE INVENTION

The present invention relates generally to teaching systems, and more particularly, to an adaptive educational tool to facilitate the instruction and learning of mechanical engineer principles such as stress-strain behavior, using an integrated systems that deploys a CAD/CAM module to design and build a crane model, a finite element analysis module to run a simulation on the crane design, and a monitoring module to collect stress-strain behavior data on the tested crane model.

BACKGROUND OF THE INVENTION

Engineering is an interdisciplinary study of math, science, and some business principles. Generally speaking, engineering courses teach students how to design, conduct experiments, identify and solve problems, understand professional and ethical responsibilities, and communicate effectively. Specific engineering principles are taught in concentrations, which include biotechnology, imaging, structural mechanics, environmental engineering, computer engineering, information science and nanotechnology. Engineering can be applied to many areas of work, so the coursework starts broad with introductory and foundational courses, and as a student focuses on a concentration, concludes with advanced topics related to their focused concentration. For instance, an engineering student with a concentration in mechanical engineering may take courses that other engineering students in other concentrations, say computer or civil engineering, may not take part of. Some of these courses include, fluid mechanics, thermodynamics, heat exchange, mechanical vibrations, advanced structural dynamics, and advanced computer aided design to name a few.

One of the fundamental skills a student will learn in engineering school is how to operate some type of computer aided design software, such as Solidworks® or ProEngineer®, during their school tenure. Computer aided design (CAD), computer aided engineering analysis (CAE), or computer aided manufacturing (CAM) software is used to increase the productivity of a designer, improve the quality of design, enables the development, modification, and optimization of the design process. Thanks to CAD, engineers can make more accurate representations and modify them easily to improve design quality. In most CAD software, an engineering can perform an analysis of a part or run a system through a simulator to electronically see how the part will function under specified conditions. However, such type of computer rendered analysis can sometimes be too difficult for an engineering student to understand without more. Indeed, not all students are able to learn or process information in the same manner.

Accordingly, there is an established need for a training system to teach mechanical principles, which incorporates and integrates computer-based simulation technology, such as FEA, and CAD/CAM technology to provide a facility that enables performance evaluations and comparisons of the design-related simulation results and the behavior of the machined article.

SUMMARY OF THE INVENTION

The present invention is directed to an educational training system for teaching mechanical principles, which enables a user or operator to make evaluations based upon simulation results of a computer-rendered structural design and performance behavior of a physical model built in accordance with the computer rendering. In one form, the structural design embodies the geometry of a crane boom. A computer-aided design (CAD) and computer-aided machining or manufacturing (CAM) module is used to generate a crane design and build a crane model based on the crane design. On the CAE side, a simulation is run on the computer-generated crane design using a finite element analysis (FEA) computational facility. The CAD may run on an electronic device, such as a computer, laptop, or the like that may include audio and video circuitry, memory or access to memory, one or more processors, I/O network interface, application program interface, read/write memory (RAM), read-only memory (ROM), writable instructions, and visual screen or display for navigation. The simulation results indicate the performance of the structural design. In one form, the finite element analysis provides the stress-strain characteristics or profile of the structural design under various input load conditions. The stress-strain performance can be demonstrated or displayed in a suitable user-interactive format such as a computer animation. On the CAM side, a physical crane model is built based upon and according to the CAD-generated crane design, producing a physical representation of the crane design, preferably in an appropriately scaled manifestation. The crane model is deployed and tested under a variety of operating scenarios and conditions, which include variable applied loads carried by the boom and different boom orientations under both static and dynamic conditions. For example, the boom can be rotated to different horizontal positions and pivoted to achieve different vertical elevations. A controller is provided to control the movement of the crane boom using a set of controllable motor-driven devices. The stress-strain characteristics can be measured under both static conditions (crane boom fixed in place) and dynamic conditions (crane boom is moving horizontally in a circular direction and/or pivoting about a horizontal axis to change elevation). The behavior and/or response of the crane model under the testing conditions is monitored using a sensor array, such as stress-strain gauges connected or distributed at various points on the crane model. The testing performance of the CAM-generated crane model is compared to the FEA-based simulation results of the CAD-generated crane design. The implementation of the structural design in the form of a crane boom is for illustrative purposes only and should not be considered in limitation of invention, as other structural designs are possible.

Introducing a first embodiment of the invention, the present invention consists of a method comprising the steps of:
generating a crane design;
performing a simulation on the crane design to provide simulation results;
providing a crane model based on the crane design;
testing the crane model under at least one operating load condition;
monitoring behavior of the crane model during testing to provide a performance measure thereof; and
comparing the simulation results and the performance measure.

In a second aspect, the step of generating the crane design further includes the step of using a computer aided design facility.

In another aspect, the step of performing the simulation further includes the step of conducting a finite element analysis of the crane design.

In another aspect, the step of providing the crane model further includes the step of using a computer aided manufacturing facility.

In yet another aspect, the monitoring step further includes the step of collecting data indicative of stress and/or strain performance characteristics of the crane model.

In another aspect, the crane model may comprise a crane boom, a control system, and a platform.

In another aspect, the platform may include at least one motor-driven drive assembly that facilitates the rotational movement of the platform about a centralized axis of the crane model. The motor-driven drive assembly may further include one or more receivers designed to receive executable command signals emitted from the control system that otherwise controls the rotational movement of the platform.

In another aspect, the crane boom may include one or more crane motor assemblies that facilitate rotational and pivoting motion of the crane boom. The one or more crane motor assemblies may include one or more receivers designed to receive executable command signals emitted from the control system that otherwise controls the rotating and pivoting of the crane boom.

In another aspect, the lifting mechanism model may include a sensing module comprising one or more sensors that measures performance and provides the performance measurements.

In another aspect, the crane model may include one or more gauges to provide and illustrate performance measurements of the crane model during the operational load conditions.

These and other objects, features, and advantages of the present invention will become more readily apparent from the attached drawings and the detailed description of the preferred embodiments, which follow.

BRIEF DESCRIPTION OF THE DRAWINGS

The preferred embodiments of the invention will hereinafter be described in conjunction with the appended drawings provided to illustrate and not to limit the invention, where like designations denote like elements, and in which.

Like reference numerals refer to like parts throughout the several views of the drawings.

DETAILED DESCRIPTION

Figure 1:
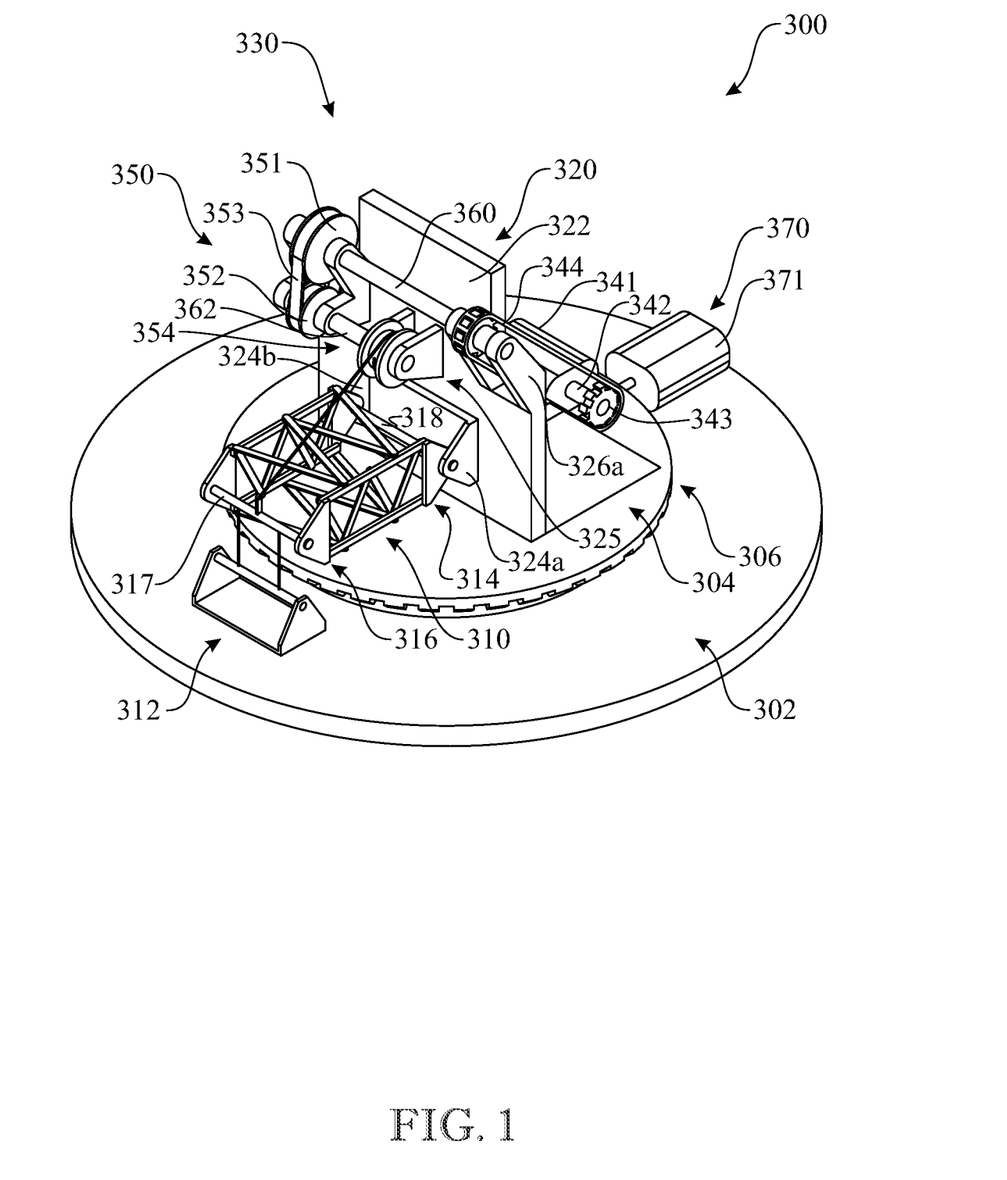
FIG. 1 presents a front, upper perspective view showing a scaled crane model built according to a preferred implementation of a first embodiment of the present invention.
Figure 2:
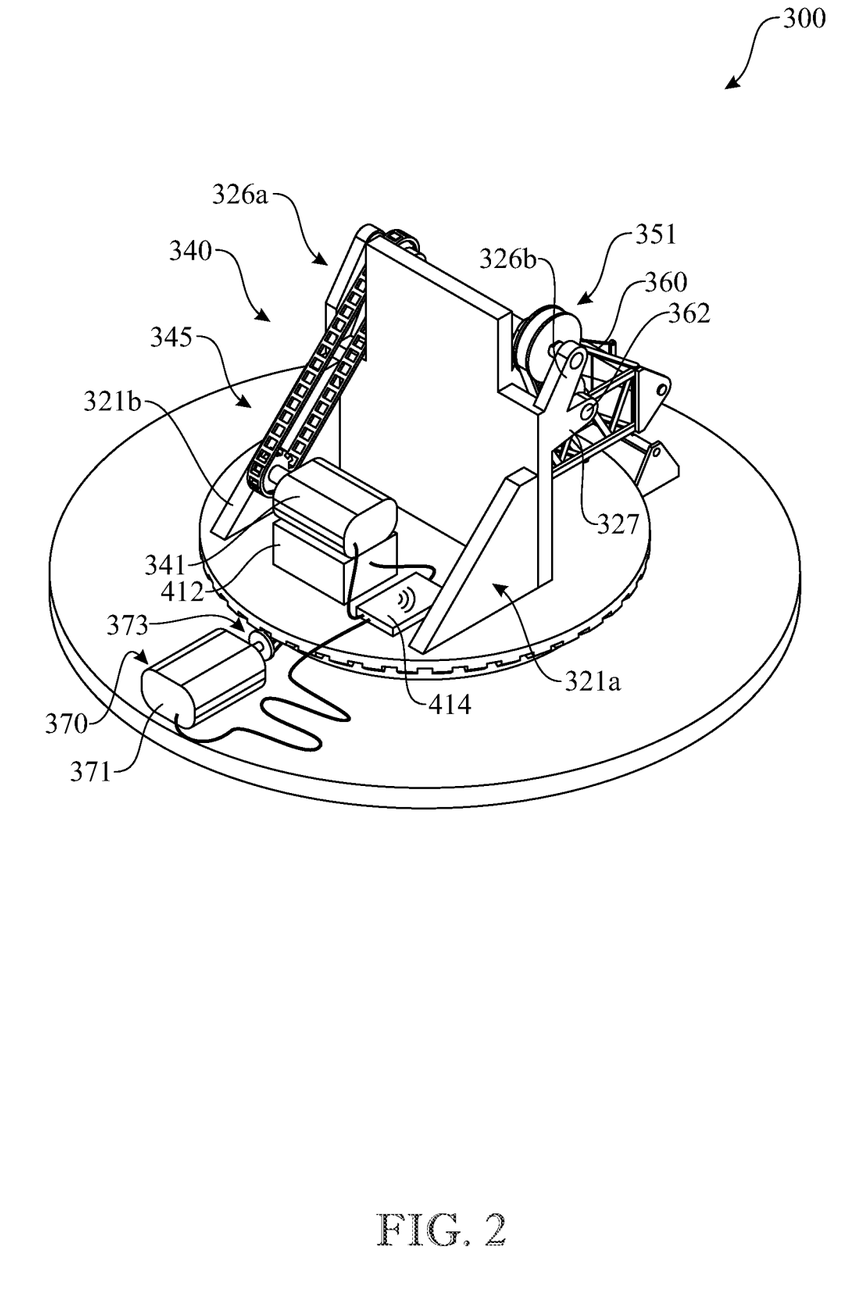
FIG. 2 presents a rear, upper perspective view of the crane model according to the first embodiment of the present invention.

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Shown throughout the figures, the present invention is directed toward a teaching or instructional system that enables a comparative evaluation between the simulation results derived from the finite element analysis of a CAD-generated crane design and the testing performance of a CAM-generated crane model under various operating conditions. The crane model is a physical representation of the crane design.

Figure 9:
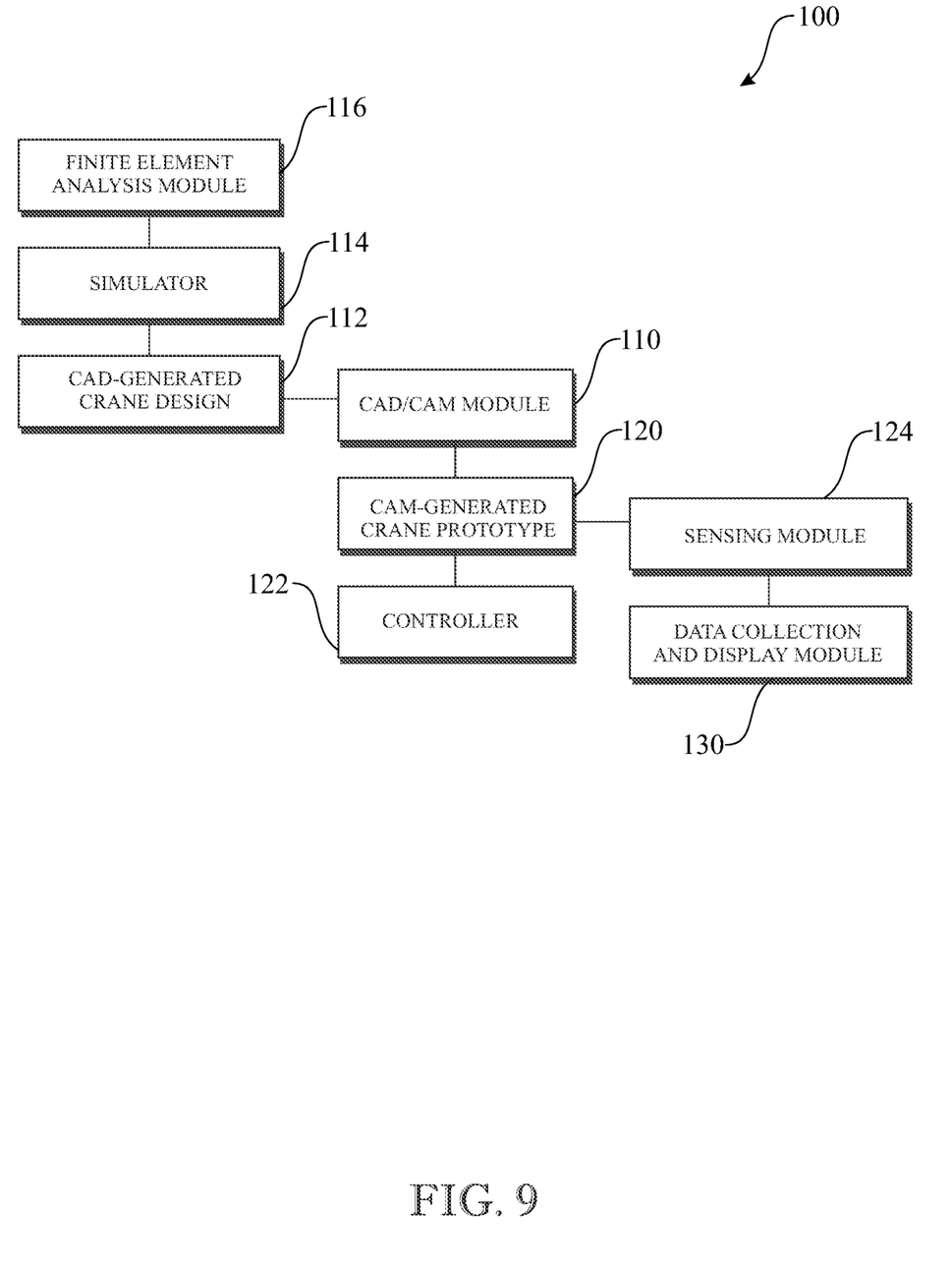
FIG. 9 presents a schematic block diagram illustration of a training apparatus according to a first embodiment the present invention and incorporating features disclosed in FIGS. 1-8.
Figure 10:
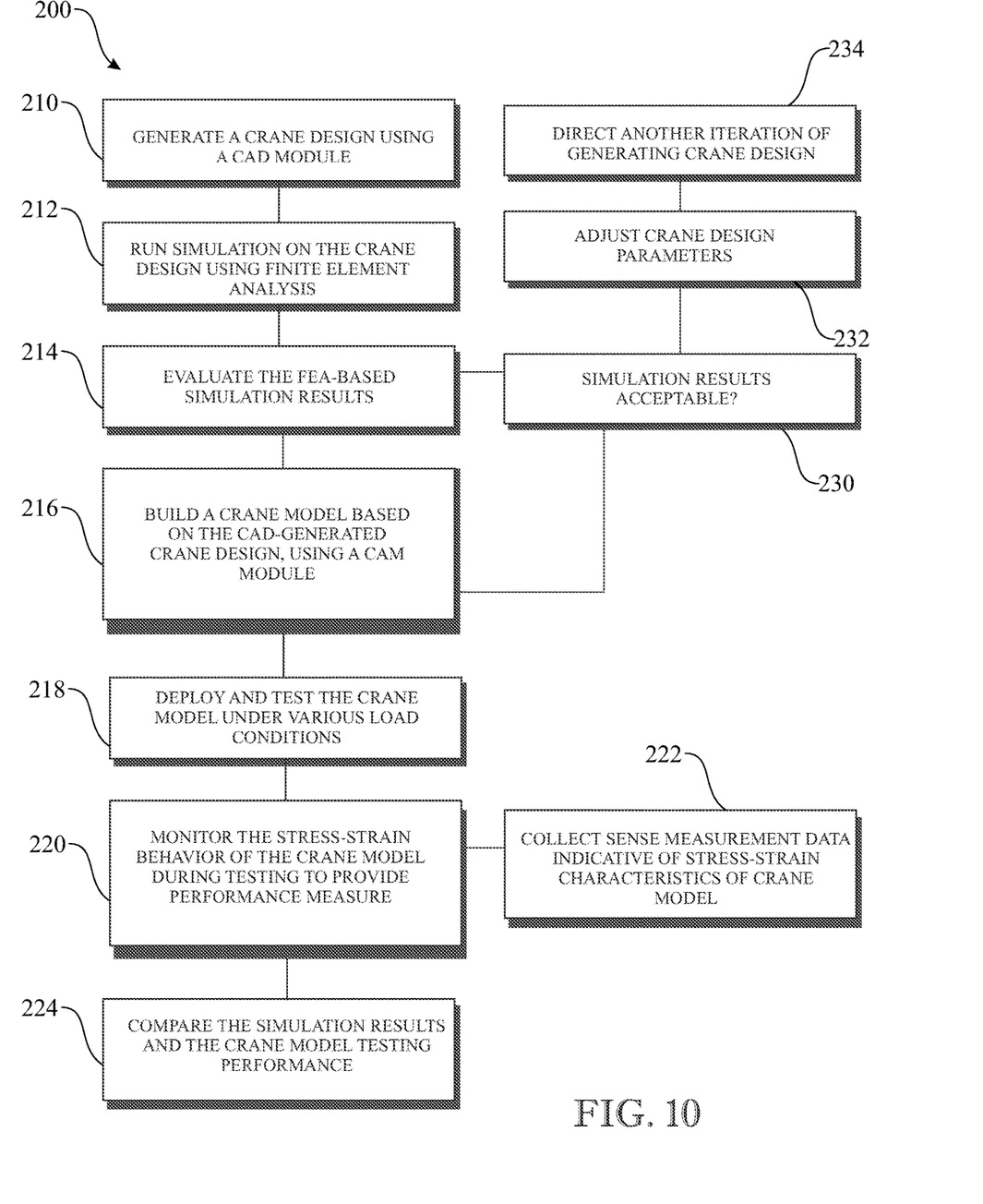
FIG. 10 presents a flow diagram illustrating an exemplary process for operating the training apparatus of the present invention disclosed in FIG. 9.

Referring initially to FIGS. 9 and 10, a system 100 (FIG. 9) and an operational sequence for operating system 100 (FIG. 10) are disclosed according to the present invention. The system 100 includes a computer-aided design (CAD) and a computer-aided machining or manufacturing (CAM) module 110. The CAD/CAM module 110 is used to generate a computer-rendered crane design 112, such as a crane boom (step 210, FIG. 10). Different structural designs are possible other than a crane design. A simulator 114 runs a simulation on the CAD-generated crane design using a finite element analysis module 116 (step 212). In particular, the simulation uses finite element analysis (FEA) to evaluate the performance characteristics of the crane design. The simulation is able to vary the load and operating conditions of the crane design, under both static and dynamic conditions. For example, the simulation can vary the amount of payload or cargo carried by the CAD-generated crane design. Additionally, the simulation is able to monitor the performance of the crane design during movement of the crane boom, such as pivoting the crane boom (raising or lowering it) and/or rotating the crane boom through a horizontal plane. The simulation can vary any number of operating parameters, including, but not limited to, elevation of the crane boom, speed of movement (both pivoting displacement and rotational displacement), and payload (e.g., size and weight). In one form, the performance characteristics provided by the FEA-based simulation indicate the stress-strain profile of the crane design 112 under various load and operating conditions. The simulation results can be provided in any suitable form well known to those skilled in the art, such as a computer-rendered animation of the crane design that is color-coded to indicate different zones of stress-strain levels. The mapping of the simulation results onto the animated crane design allow a user to visually inspect and evaluate different stress-strain points distributed across various locations of the structure of the crane design. The animation can also display movement of the crane design in a conventional manner. The use of finite element analysis to run the simulation of the CAD-generated crane design can be conducted in any conventional or suitable manner well known to those skilled in the art.

A feedback loop may be employed to optimize the structure of the crane design in terms of optimal stress-strain performance. In such an implementation, the FEA-based simulation results are evaluated to determine if they are acceptable (steps 214, 230). If deemed not acceptable, the crane design parameters are adjusted (step 232) and another CAD-generated crane design is produced according to the crane design adjustment (step 234). The simulation is run again on the adjusted crane design. Once the simulation results are found acceptable, a physical crane model is built by the CAD/CAM module 110 based on the final CAD-generated crane design, producing a CAM-generated crane prototype or model 120. Any suitable structural geometry can be used to develop the CAD-generated crane design and CAM-generated crane model.

The crane model is deployed and tested under various load and operating conditions similar to how the simulator 114 was programmed to run a simulation of the CAD-generated crane design under a variety of load and operating conditions (step 218). For this purpose, the CAM-generated crane model 120 is equipped with a control system 122 configured to control movement of the crane model, which includes, but is not limited to, pivoting displacement of the crane model (i.e., raising or lowering a payload carried by the crane model) and rotary displacement of the entire crane model through a horizontal plane. It is of interest to determine and evaluate the stress-strain levels experienced by the crane model during deployment and testing. Towards this end, during testing, the stress-strain behavior of the crane model is monitored by a sensing module 124 in order to provide performance measures and indicia (step 220). This stress-strain behavior reflects the response of the crane model to different and varying applied load and operating conditions. The sensing module 124 is provided to acquire and collect sensed measurement data indicative of stress-strain characteristics of the deployed crane model (step 222). In one form, the sensing module 124 can utilize stress-strain gauges attached to various points and locations of interest on the crane model, particularly those areas where the crane model needs the greatest structural integrity and those areas where the crane model may experience high stress (e.g., pivot axis and load-bearing end).

The present invention can be adapted for use as a learning tool to help individuals learn mechanical principles as applied to structures resembling real-world applications, such as a crane boom design. A user can use the computer-based CAD and simulation facilities to readily change, modify, and otherwise adjust design parameters in order to evaluate how different designs produce different stress-strain profile characteristics. In this manner, a user can better learn the relationship between certain structural designs and the accompanying stress-strain performance. The simulation also allows the crane design to be exercised or run through a variety of operating conditions such as animated movement of the crane design, which offers the user the chance to learn about static and dynamic loading. Additionally, the present invention affords the user the chance to see a real-world application of the CAD-generated crane design in the form of a physical embodiment or representation of the crane design, namely, the CAM-generated crane model built according to the specifications of the crane design. In one alternative exemplary form, a robust beam model made out of aluminum may be built to the specifications of the generated crane model instead of the crane model. The beam model could be used to test crane design experiencing similar effects of excessive loading that would otherwise exceed the built crane model's load capacity, i.e., the crane model is more fragile than the beam model. The present invention provides a facility to deploy and test the crane model and to provide data indicative of the behavioral response of the crane model to varying load and operating conditions (i.e., sensed stress-strain behavior). The testing performance of the CAM-generated crane model can be compared to the FEA-based simulation results of the CAD-generated crane design to examine the closeness of fit or match between them (step 224), where the simulation results signify the ideal or theoretical outcome and the testing performance signifies the practical or embodied outcome. A data collection and display module 130 can be used to facilitate this comparison feature, such as a computer workstation.

Referring now to FIGS. 1-8, a preferred implementation of the present invention is disclosed that embodies the features disclosed in FIGS. 9 and 10. Referring initially to FIGS. 1-6, and more particularly to FIGS. 1-2, a scaled version of a crane model or prototype 300 is disclosed, built according to the CAD/CAM functionality disclosed in FIGS. 9 and 10. The crane model 300 includes a crane boom generally illustrated at 310 supported by a framework generally illustrated at 320, which is located on a rotatable turntable or carousel platform 304 that in turn is disposed on a relatively stationary fixed base 302. The crane model 300 is configured for selectively and independently controllable pivoting and rotational motion using a crane drive assembly generally illustrated at 330 and a carousel drive assembly generally illustrated at 370, respectively.

Figure 5:
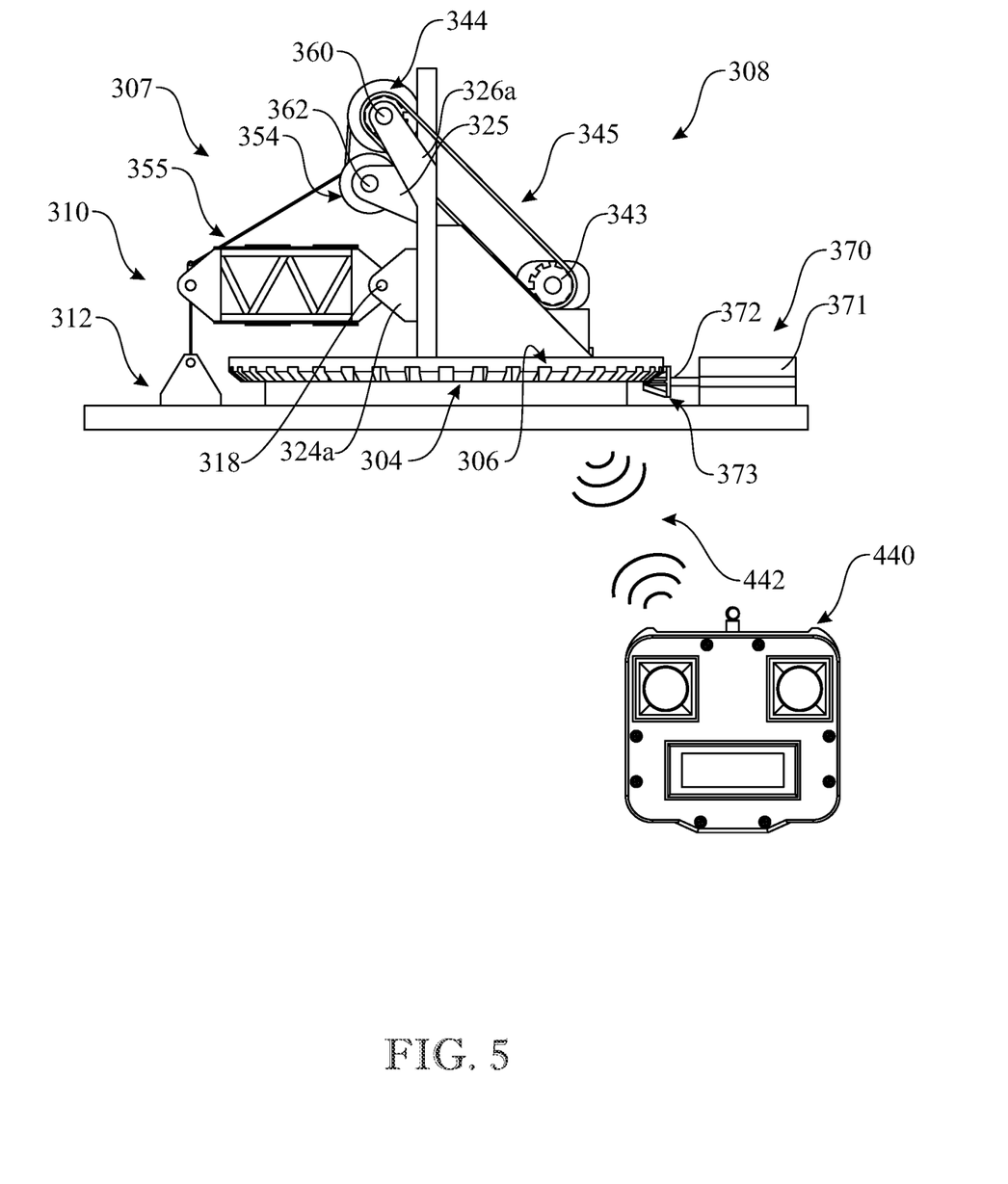
FIG. 5 presents a side elevation view of the crane model according to the first embodiment of the present invention, illustrating remote control operation of the crane drive motor to direct pivoting movement of the crane boom.

The crane boom 310 may have any conventional design well known to those skilled in the art, such as a latticed configuration. The crane boom 310 includes a load bearing end 316 carrying a payload or cargo 312 hung from a winch cable attachment bar 317, and a pivoting end 314 including a crane pivot axis or shaft 318 that rotatably supports crane boom 310 and about which crane boom 310 can pivot. The framework 320 includes an upright or vertical support wall 322 and a pair of support legs 321a,b to help hold and support vertical wall 322. The crane model 300 has a front side 307 where crane boom 310 is housed and a rear side 308 (FIG. 5). A pair of crane-supporting bracket features 324a,b, which extend or project from support wall 322, rotatably support the crane pivot axis 318.

The crane model 300 further includes a motor-driven carousel drive assembly generally illustrated at 370, which facilitates rotational movement of carousel 304 and, in turn, the tandem, accompanying rotational movement of crane boom 310 through a horizontal plane. The carousel drive assembly 370 includes a crane rotary-displacement motor 371 having a rotary output drive shaft 372 and a motor-driven gear 373 disposed at the free end of output shaft 372. For purposes of adapting itself as a driven component, the carousel 304 includes a circumferential gear feature 306 disposed at its peripheral edge. The motor-driven gear 373 is configured in meshing engagement with the carousel peripheral gear 306 (FIG. 5). Activation of the motor 371 causes a rotation of its output shaft 372 and accompanying motor-driven gear 373, which in turn induces a rotation of carousel 304 due to the meshing engagement between motor-driven gear 373 and carousel peripheral gear 306. The motor 371 has a reversible operation, so that carousel 304 can be rotated in either circular direction. The drive assembly 370 facilitates rotation of crane boom 310 through a horizontal plane.

The crane drive assembly 330 includes an upper rotatable shaft 360 and a lower rotatable shaft 362 disposed at the front side 307 of support framework 320. The lower rotatable shaft 362 carries a winch assembly including a cable-winding drum 354 rotatably supported by lower shaft 362. The cable drum 354 carries and dispenses a cable reel, guy line or winch 355 that connects at one end to the winch cable attachment bar 317 disposed at the load bearing end 316 of crane boom 310. Rotation of the lower shaft 362 causes a rotation of cable drum 354, which induces the crane boom 310 to displace in a pivoting action about its crane pivot axis 318 in response to the advancing (dispensing) or retracting action of cable winch 355. The displacement can raise or lower the crane boom 310 depending on the direction of rotation of the winch cable drum 354. In particular, as the cable winch 355 is advanced or dispensed (unwound) from cable drum 354, the crane boom 310 pivots in a downward direction, lowering it. Alternately, as the cable winch 355 is retracted or reeled in (wound) to cable drum 354, the crane boom 310 pivots in an upward direction, raising it. A bracket feature generally illustrated at 325, which projects from vertical support wall 322, retains the winch cable drum 354. The lower shaft 362 is rotatably supported by the combination of bracket feature 325 and a lower shaft support 327 (FIG. 2) configured as a projection arm. A pair of upper shaft support structures or projection arms 326a,b, which extend from vertical support wall 322, rotatably supports the upper shaft 360. In a preferred form, the upper shaft 360 and lower shaft 362 are disposed in a parallel arrangement.

The crane assembly 330 includes a motor drive apparatus generally illustrated at 340 that drives rotation of upper shaft 360. The crane assembly 330 further includes a crane direct-drive apparatus generally illustrated at 350, which communicates the rotation of upper shaft 360 to lower shaft 362 to cause rotation of winch drum 354 and thereby induce pivoting displacement of crane boom 310. The motor drive apparatus 340 includes a crane pivot-displacement motor 341 having an output drive shaft 342 and a motor-driven sprocket gear 343 carried at the end of output shaft 342. The motor drive apparatus 340 further includes a belt-driven sprocket gear 344 rotatably mounted on upper shaft 360. A drive belt 345 connects the motor-driven sprocket gear 343 to the belt-driven, shaft-mounted sprocket gear 344. Operation of motor 341 induces a rotation of upper shaft 360, which occurs in response to the rotation of motor-driven sprocket gear 343 that is communicated to shaft-mounted sprocket gear 344 via belt 345. Motor 341 is reversible in order to change the direction of rotation of upper shaft 360.

The crane direct-drive apparatus 350 includes an upper shaft pulley 351 rotatably mounted to the upper shaft 360 and a lower shaft pulley 352 rotatably mounted to the lower shaft 362. A drive belt 353 connects the upper shaft pulley 351 and the lower shaft pulley 352. The crane direct-drive apparatus 350 communicates rotation of upper shaft 360 to lower shaft 362. In particular, the rotation of upper shaft 360 causes upper shaft pulley 351 to rotate in tandem, which induces the lower shaft pulley 352 to likewise rotate in response to the driving connection of drive belt 353. The rotation of lower shaft pulley 352 causes the lower shaft 362 to rotate in tandem, which in turn induces the winch cable drum 354 to rotate and effectuate a pivoting displacement of crane boom 310 (i.e., raising or lowering payload 312 carried by crane boom 310). The reversible operation of motor 341 of motor-drive apparatus 340 allows the crane boom 310 to be raised or lowered.

Referring now to FIGS. 3-6, the operation of crane model 300 is disclosed. For purposes of controlling the operation of crane model 300, a control module 414 is provided on-site or on-board with crane model 300. The control module 414 is configured to selectively and independently control the operation of crane pivot-displacement motor 341 and crane rotary-displacement motor 371. A remote controller 440 communicates over a wireless link 442 to control module 414. The user-managed remote controller 440 provides suitable control instructions and commands to control module 414 to direct the operation of crane pivot-displacement motor 341 and crane rotary-displacement motor 371.

Figure 3:
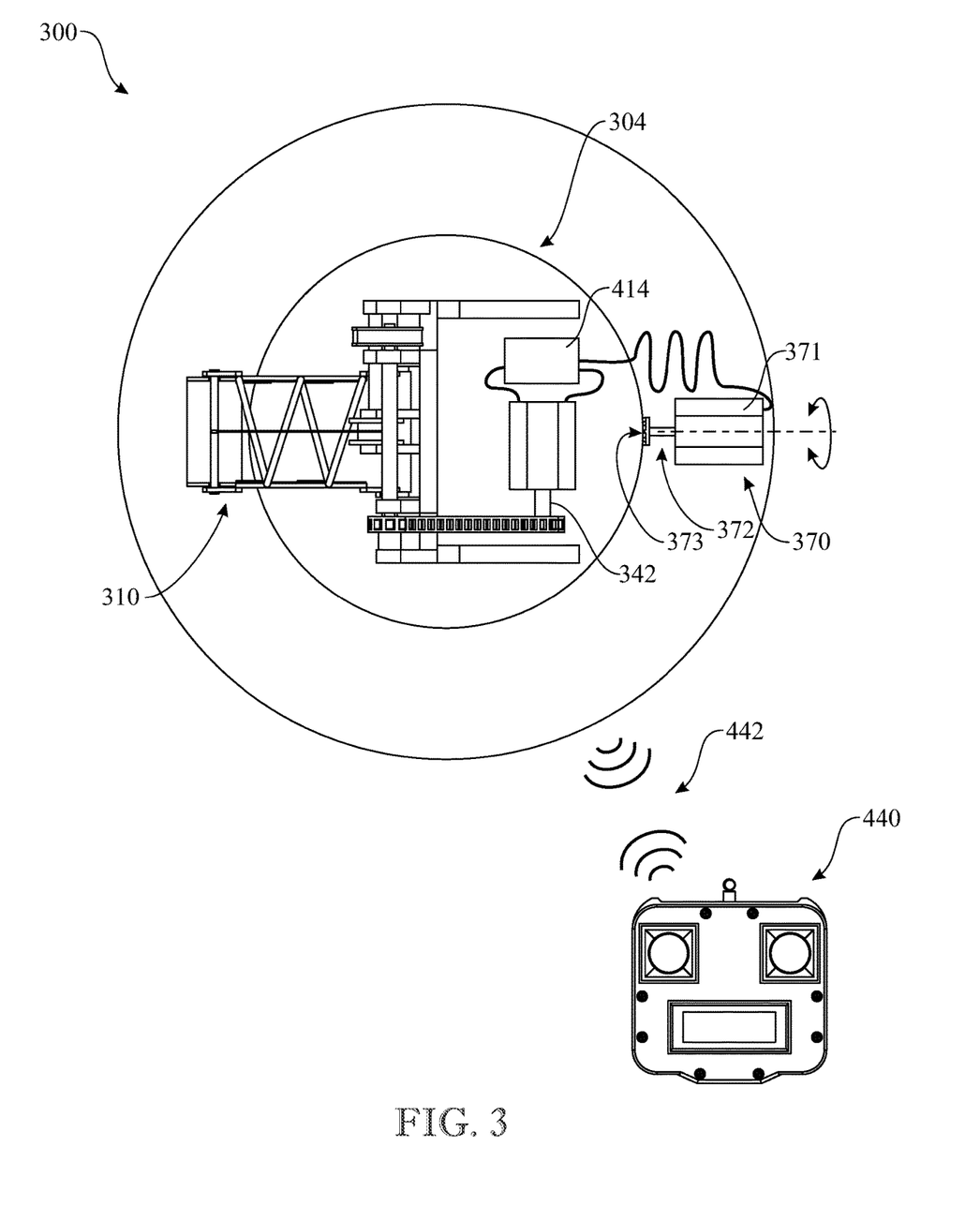
FIG. 3 presents an upper plan view of the crane model according to the first embodiment of the present invention, illustrating remote control operation of the carousel drive motor to direct rotational movement of the carousel-style turntable platform supporting the crane boom.
Figure 4:
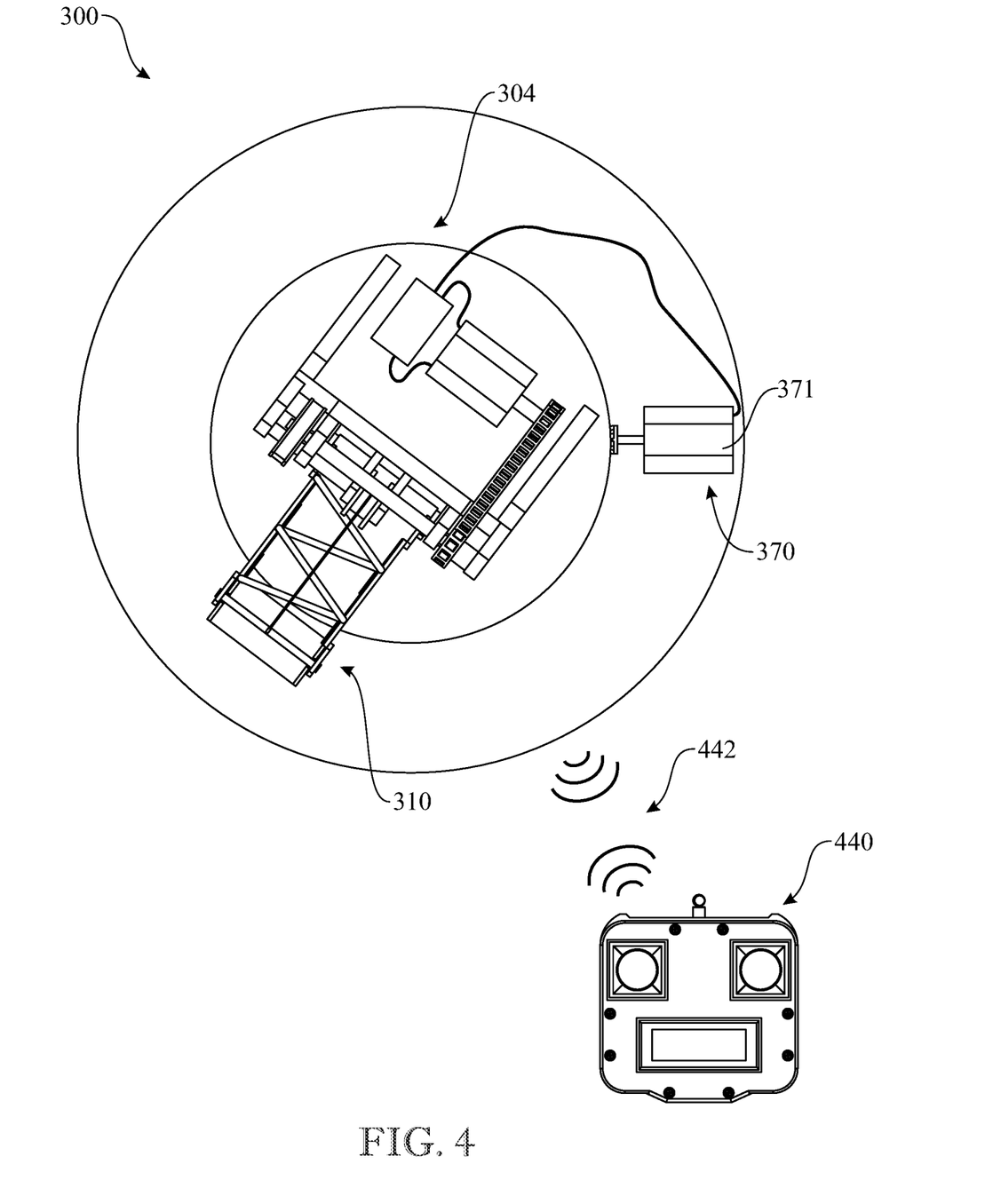
FIG. 4 presents an upper plan view of the crane model according to the first embodiment of the present invention, illustrating rotational displacement of the carousel in response to the remote control operation of the carousel drive motor originally disclosed in FIG. 3.
Figure 6:
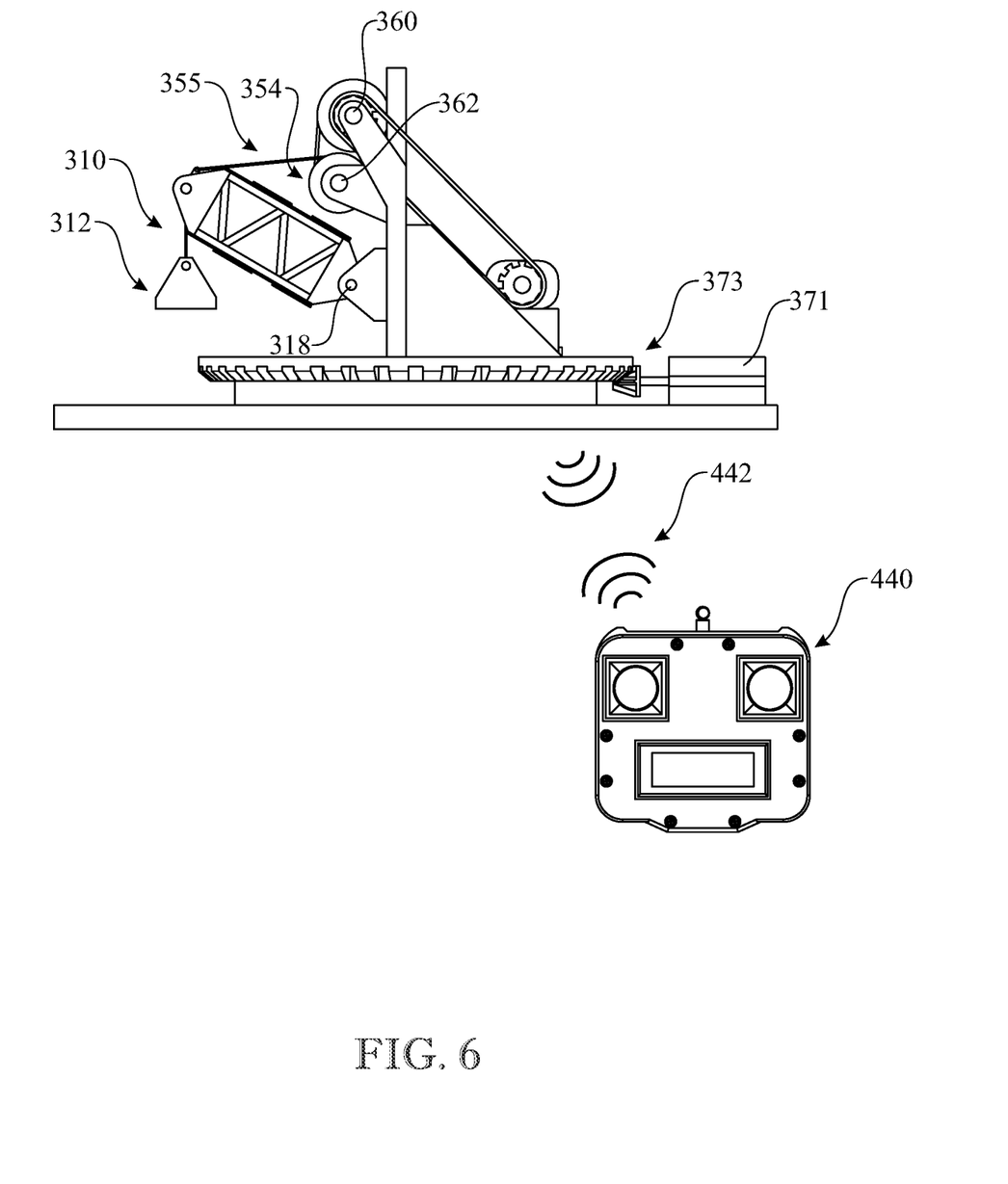
FIG. 6 presents a side elevation view of the crane model according to the first embodiment of the present invention, illustrating pivoting displacement of the crane boom in response to the remote control operation of the crane drive motor originally disclosed in FIG. 5.

Referring first to FIGS. 3 and 4, the rotary displacement of crane model 300 is disclosed. In response to instructions from remote controller 440 over link 442, the on-board control module 414 directs the activation and operation of crane rotary-displacement motor 371. The motor 371 directs the motor-driven gear 373 to drive the peripheral gear 306 of carousel 304, inducing the carousel 304 and accompanying crane model 300 to rotate (FIG. 4). Referring next to FIGS. 5 and 6, the pivoting displacement of crane boom 310 of crane model 300 is disclosed. In response to instructions from remote controller 440 over link 442, the on-board control module 414 directs the activation and operation of crane pivot-displacement motor 341. The motor 341 directs a chain-reaction process, via the intermediate mechanical linkages and connections of motor-drive apparatus 340 and crane direct-drive apparatus 350 of crane drive assembly 330, which ultimately drives the rotation of winch cable drum 354 to effectuate a pivoting displacement of crane boom 310. In the illustrative sequence of FIGS. 5 and 6, this upward pivoting displacement of crane boom 310 lifts payload 312 from a resting position (non-load bearing condition) to a suspended position (applied load-bearing condition for crane boom 310).

Figure 7:
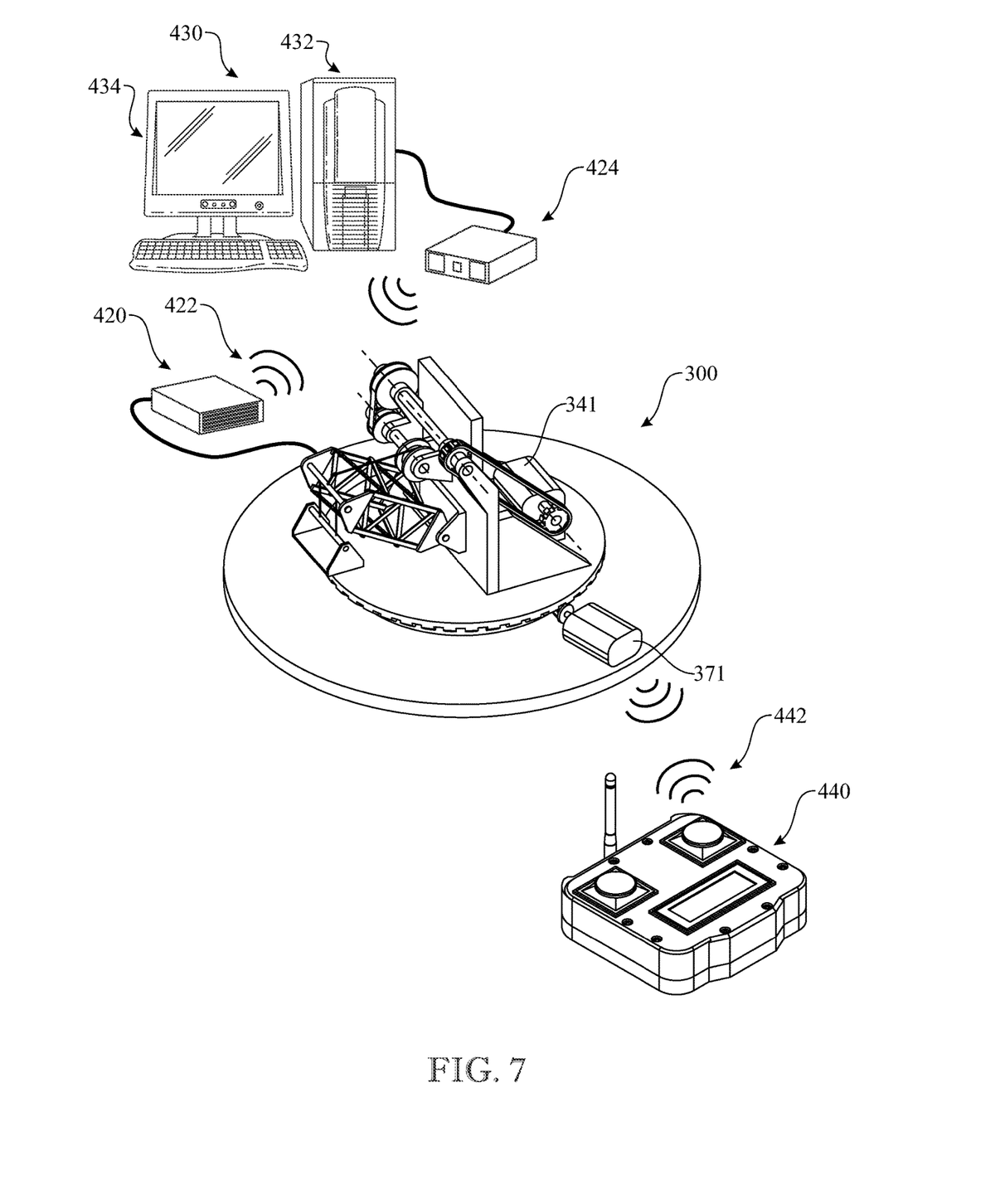
FIG. 7 presents a perspective view of the integrated system configured to monitor performance of the crane boom operation according to the first embodiment of the present invention.
Figure 8:
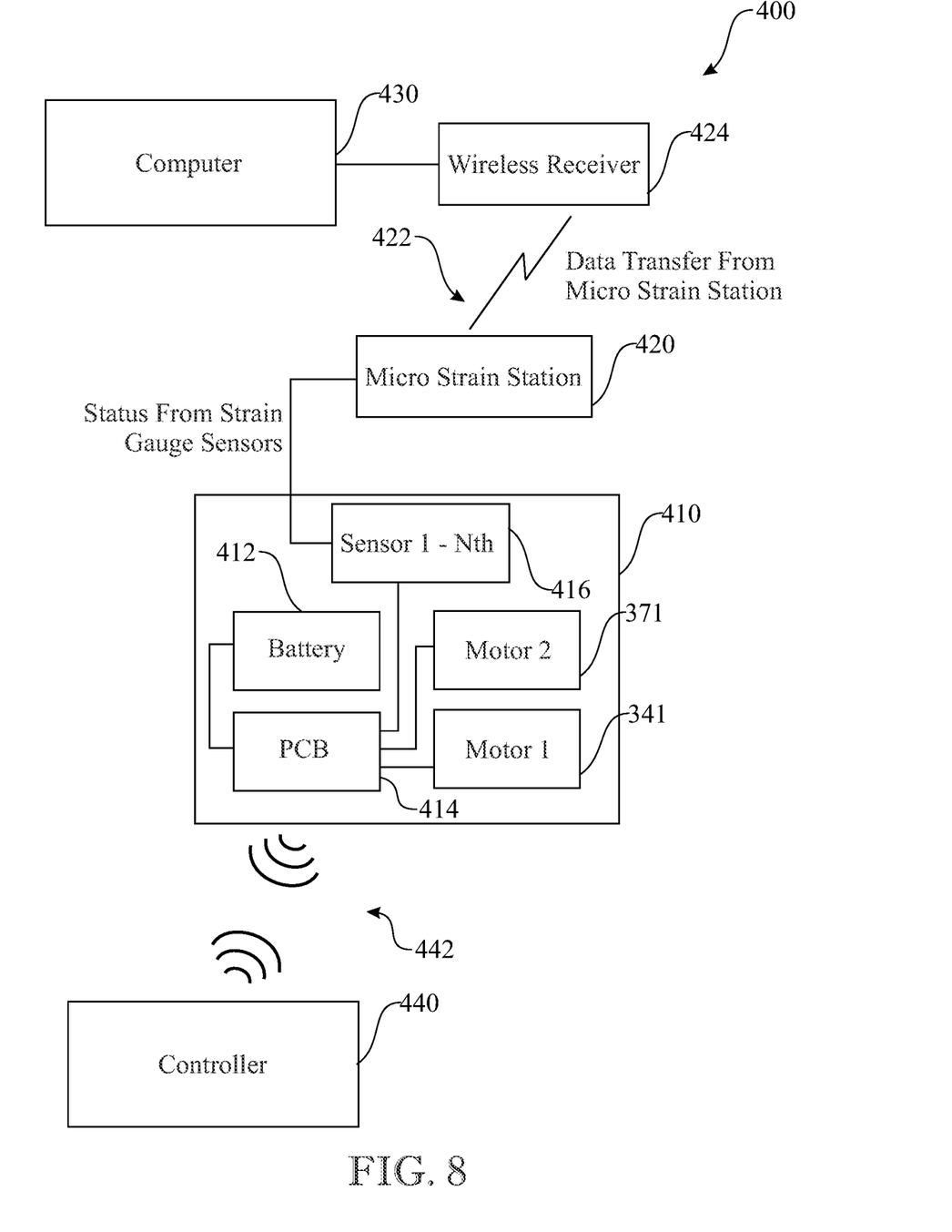
FIG. 8 presents a schematic block diagram illustration of the integrated system originally disclosed in FIG. 7.

Referring now to FIGS. 7 and 8, an integrated system 400 is disclosed (FIG. 8) that is used in combination with crane model 300 to form a fully integrated application environment (FIG. 7). The integrated system 400, among other features, controls crane model 300 and collects and analyzes data indicative of the performance behavior of crane model 300, such as stress-strain measurements. As discussed, the system 400 includes remote controller 440 communicating over a wireless link 442 to on-board control module 414 to direct the activation and operation of crane pivot-displacement motor 341 and crane rotary-displacement motor 371. The on-board control module 414 can be provided in any suitable form well known to those skilled in the art, such as a printed circuit board (PCB). An on-board battery 412 is provided to furnish power to PCB 414 and motors 341, 371. The combination of motors 341, 371 and related electronic circuitry (PCB 414 and battery 412) can be functionally incorporated into a control and sensor module or unit 410. The module 410 further includes a sensor array 416 that includes a set of individual sensor elements attached to crane boom 310 at any of various locations in order to provide data indicative of the performance of crane model 300 during operation. For example, in one form, the sensor array 416 includes an array of stress-strain gauges that measure changes in resistance as an indication of changes in stress. The stress-strain gauges can be provided at various locations on crane boom 310 in order to provide a profile of the structural stresses that crane boom 310 is experiencing during operation as a function of location. The stress-strain data measurements from sensor array 416 are provided to a micro strain station 420, which transfers and otherwise transmits the data over a wireless communications link 422 to a wireless receiver 424 connected to a workstation or computer system 430. The computer system 430 can be configured in any suitable conventional form well known to those skilled in the art. For example, in one form, the computer system 430 can include a computer display 434 and a hardware-software computer device 432 having memory, processing capabilities, and software such as executable application programs to compile, process, analyze, evaluate, and display the location-correlated sensor data, preferably in real time as crane model 300 is operating.

Since many modifications, variations, and changes in detail can be made to the described preferred embodiments of the invention, it is intended that all matters in the foregoing description and shown in the accompanying drawings be interpreted as illustrative and not in a limiting sense. Furthermore, it is understood that any of the features presented in the embodiments may be integrated into any of the other embodiments unless explicitly stated otherwise. The scope of the invention should be determined by the appended claims and their legal equivalents.

What is claimed is:

1. A method for teaching mechanical engineering principles, comprising the steps of:
   providing a system executable on one or more readable storage media executed by one or more processors in electronic communication with one or more databases and one or more subsystems, allowing the system to generate one or more designs or run one or more simulations;
   generating a crane design using the system;
   performing a simulation on the crane design to provide simulation results;
   providing a crane model based on the crane design, the crane model comprising a crane boom, a control system, and a platform, wherein the platform includes at least one motor-driven drive assembly that facilitates the rotational movement of the platform about a centralized axis of the crane model, and further wherein the motor-driven drive assembly includes one or more receivers designed to receive executable command signals emitted from the control system to initiate rotational movement of the platform;
   testing the crane model under at least one operating load condition;
   monitoring behavior of the crane model during testing to provide one or more performance measurements; and
   comparing the simulation results and the performance measurements of the crane design and the crane model.

2. The method of claim 1, wherein generating the crane design is done through the use of a computer-aided design facility.

3. The method of claim 1, wherein the simulation includes conducting a finite element analysis of the crane design.

4. The method of claim 1, wherein providing the crane model is done through the use of a computer-aided manufacturing facility.

5. The method of claim 1, wherein monitoring the behavior of the crane model includes collecting data indicative of stress and/or strain performance characteristics of the crane model.

6. The method of claim 1, wherein the simulation results of the crane design include color-coded zones indicating different zones of stress or strain levels on portions of the crane design.

7. The method of claim 6, including the step off mapping the simulation results onto the crane design.

8. The method of claim 1, wherein the crane boom includes one or more crane motor assemblies that facilitate rotational and pivoting motion of the crane boom.

9. The method of claim 8, wherein the one or more crane motor assemblies include one or more receivers designed to receive executable command signals emitted from the control system to control the rotating and pivoting of the crane boom.

10. The method of claim 1, wherein the crane model includes a sensing module comprising one or more sensors that measures performance and provides the performance measurements.

11. The method of claim 1, wherein the crane model includes one or more gauges to provide performance measurements of the crane model during the at least one operating load condition.

12. The method of claim 11, wherein the one or more gauges comprise a stress gauge or a strain gauge.

13. A method for teaching mechanical engineering principles, comprising the steps of:
   providing a system executable on one or more readable storage media executed by one or more processors in electronic communication with one or more databases and one or more subsystems, allowing the system to generate one or more designs or run one or more simulations;
   generating a crane design using the system;
   performing a simulation on the crane design to provide simulation results;
   providing a crane model based on the crane design, the crane model comprising:
      a platform,
      a crane boom attached to the platform, and
      a control system;
   testing the crane model under at least one operating load condition;
   monitoring behavior of the crane model during testing to provide one or more performance measurements; and
   comparing the simulation results and the performance measurements of the crane design and the crane model;
   wherein
   a remote control is in communication with the control system of the crane model over a wired or wireless communication system to initiate pivotal displacement of the crane boom or rotary displacement of the platform.

14. The method of claim 13, wherein the simulation results of the crane design include color-coded zones indicating different zones of stress or strain levels on portions of the crane design.

15. A method for teaching mechanical engineering principles, comprising the steps of:
providing a system executable on one or more readable storage media executed by one or more processors in electronic communication with one or more databases and one or more subsystems, allowing the system to generate one or more designs or run one or more simulations;
generating a crane design using the system;
performing a simulation on the crane design to provide simulation results;
providing a crane model based on the crane design, the crane model comprising:
a platform including at least one motor-driven drive assembly that facilitates the rotational movement of the platform about a centralized axis of the crane model,
a crane boom attached to the platform, the crane boom including one or more crane motor assemblies that facilitate rotational and pivoting motion of the crane boom, and
a control system in communication with the one or more crane motor assemblies of the crane boom and the at least one motor-driven drive assembly of the platform,
wherein the motor-driven drive assembly of the platform includes one or more receivers designed to receive executable command signals emitted from the control system to control the rotational movement of the platform, and
wherein the one or more crane motor assemblies of the crane boom include one or more receivers designed to receive executable command signals emitted from the control system to control the rotating and pivoting of the crane boom;
testing the crane model under at least one operating load condition;
monitoring behavior of the crane model during testing to provide one or more performance measurements; and
comparing the simulation results and the performance measurements of the crane design and the crane model.

16. A method for teaching mechanical engineering principles, comprising the steps of:
providing a system executable on one or more readable storage media executed by one or more processors in electronic communication with one or more databases and one or more subsystems, allowing the system to generate one or more designs or run one or more simulations;
generating a crane design using the system;
performing a simulation on the crane design to provide simulation results;
providing a crane model based on the crane design, the crane model comprising a crane boom, a control system, and a platform, wherein the crane boom includes one or more crane motor assemblies that facilitate rotational and pivoting motion of the crane boom;
testing the crane model under at least one operating load condition;
monitoring behavior of the crane model during testing to provide one or more performance measurements; and
comparing the simulation results and the performance measurements of the crane design and the crane model.

17. The method of claim 16, wherein the one or more crane motor assemblies include one or more receivers designed to receive executable command signals emitted from the control system to control the rotating and pivoting of the crane boom.

\* \* \* \* \*